US005956636A

United States Patent [19]
Lipsit

[11] Patent Number: 5,956,636
[45] Date of Patent: Sep. 21, 1999

[54] METHOD AND SYSTEM FOR AUTOMATIC ACTIVATION OF A WIRELESS DEVICE

[75] Inventor: James Mason Lipsit, Lake Worth, Fla.

[73] Assignee: AT&T Wireless Services Inc., Redmond, Wash.

[21] Appl. No.: 08/683,013

[22] Filed: Jul. 16, 1996

[51] Int. Cl.$^6$ ....................................................... H04M 1/66
[52] U.S. Cl. ............................ 455/411; 455/419; 455/551
[58] Field of Search ..................................... 455/410, 411, 455/414, 412, 415, 435, 551, 418, 419, 420, 406, 408; 380/23, 25

[56] References Cited

U.S. PATENT DOCUMENTS

| | | | |
|---|---|---|---|
| 5,077,790 | 12/1991 | D'Amico et al. | |
| 5,301,223 | 4/1994 | Amadon et al. | |
| 5,301,234 | 4/1994 | Mazziotto et al. | 380/23 |
| 5,329,578 | 7/1994 | Brennan et al. | 455/414 |
| 5,557,676 | 9/1996 | Naslund et al. | 380/23 |
| 5,572,571 | 11/1996 | Shirai | 455/551 |

FOREIGN PATENT DOCUMENTS

| | | |
|---|---|---|
| 459 488 A2 | 12/1991 | European Pat. Off. |
| 778 716 A2 | 6/1997 | European Pat. Off. |
| 95 15066 A1 | 6/1995 | WIPO |

OTHER PUBLICATIONS

Sam Levenson & Karen Wong, "Rapid Service Activation for Personal Communications Access Services", 1994 Networks for Personal Communications, 1994, pp. 37–41.

*Primary Examiner*—Lee Nguyen

[57] ABSTRACT

Methods and apparatus for automatic activation of a wireless device in a subscription activation system are provided which use information received from a programmed but non-activated device. In one variation, the subscription activation system determines that the received information satisfies a parameter necessary for activation. In another variation, the subscription activation system verifies that the information received satisfies a previously determined criterion necessary for activation. Based upon the above, the subscription activation system activates the device. In a related manner, a system is constructed which uses an activation unit configured to receive and process information from a programmed non-activated wireless device. Using the information, the activation unit determines if activation criteria necessary for activation of the programmed wireless device in the system are satisfied and, based upon the information and if the criteria are satisfied, the activation unit activates the wireless device in the system.

27 Claims, 5 Drawing Sheets

METHOD AND SYSTEM FOR AUTOMATIC ACTIVATION OF A WIRELESS DEVICE

FIELD OF THE INVENTION

The present invention relates generally to wireless communication devices and, more particularly, to automatic activation of wireless communication devices.

BACKGROUND OF THE INVENTION

Recent years have seen rapid growth in public use of wireless communication devices, particularly cellular phones. Wireless communication devices are being purchased in increased numbers and the types of apparatus which take advantage of wireless communication capabilities is also increasing.

Currendy, with cellular telephones, a wireless phone generally may not initiate and complete calls until it is purchased, registered with a service provider and activated. It is well known that cellular channels are blocked to unauthorized callers who are not registered or whose cellular phones are not activated.

Typically, cellular service providers or authorized distributors sell an inactive phone or other wireless communication device to prospective customers. At this point, the phone is not useable, because it must both be programmed and activated. Programming generally requires that certain information be input to and stored in the memory of the wireless device. In most cases this is handled by the sales agent at the point of sale. Activation generally involves making certain parameters known to a particular wireless service provider within a geographic location. In most cases, this involves the service provider obtaining certain of the programmed parameters from the sales agent at the time of purchase and altering its system so that calls from that device will be recognized by the system (i.e. they will not be blocked). Once both have been accomplished, the wireless device becomes useable.

Programming and activation of a cellular phone is a time consuming process. As a result, specially trained sales agents are routinely used to program the phones and perform the steps necessary for activation. In addition, specialized equipment connected between the point of sale and the service provider may also be required. Thus, for the cellular telephone industry, programming and activation of a wireless phone is recognized as a labor intensive major bottleneck in the acquisition of wireless subscribers.

Thus, there is a need in the art for a method and system which eliminates the above bottleneck by eliminating the need for any face-to-face transaction between a sales agent and a customer or the need for the customer to use any device other than the non-activated wireless device for provisioning purposes.

SUMMARY OF TEE INVENTION

In accordance with the present invention, methods and apparatus for automatic activation of a wireless device in a subscription activation system are provided. In one variation of the method, information is received from a programmed but non-activated device in the subscription activation system. The subscription activation system determines that the received information satisfies a parameter necessary for activating the programmed but non-activated device. Based upon that information, the subscription activation system automatically activates the non-activated device.

In another variation of the method, information, which was transmitted over a wireless channel from a programmed, non-activated, wireless telecommunication device is received in the subscription activation system. The subscription activation system verifies that the information received satisfies a previously determined criterion necessary for activation of the wireless telecommunication device. Based upon that information, the subscription activation system activates the wireless telecommunication device.

A system constructed in accordance with the present invention has an activation unit. The activation unit is configured to receive and process information from a programmed non-activated wireless device. Using the information, the activation unit determines if activation criteria necessary for activation of the programmed wireless device in the system are satisfied. The activation unit is further configured so that, based upon the information and if the criteria are satisfied, the activation unit activates the wireless device in the system.

Advantages deriving from the present invention will become apparent from the following detailed description considered in conjunction with the accompanying drawings. It is to be understood, however, that the drawings are intended solely for purposes of explaining the invention and illustrating its versatility, not as a definition of the limits of the invention, for which reference should be made to the appended claims.

BRIEF DESCRIPTION OF THE DRAWINGS

In the drawings, wherein like reference numerals delineate similar elements throughout the several views.

DETAILED DESCRIPTION

To facilitate the description of the invention, certain terms will now be defined. As used herein, the terms "wireless communication device" or "wireless device", are interchangeably meant to refer interchangeably to each other and to cellular telephones, radio-telephones and other devices configured for wireless communication functionality in conjunction with, or to enhance, their operation. Examples of such other devices include: laptop computers, hand-held computer type devices and Personal Digital Assistants (PDAs) connected to, or fitted with, wireless modems or wireless transmitter/receivers.

It is also expected that the popularity of the internet will likely result in the development of portable internet-specific devices for wireless internet access/communication. Such devices or their analogues are also contemplated to be wireless communication devices as defined herein.

Additionally, as used herein, the term "non-activated" when referring to a wireless device, means a wireless device which is not yet authorized for unblocked communication in the service provider's system.

Finally, the term "agreed upon" as used in connection with a security code is meant solely to convey a common knowledge between parties, irrespective of the party with which the security code originated. In other words, a security code is "agreed upon" between a service provider or a wireless device distributor and a customer/recipient if it is known to both the service provider and the customer/recipient, or if it is known to both the wireless device distributor and the customer/recipient.

Figure 1:
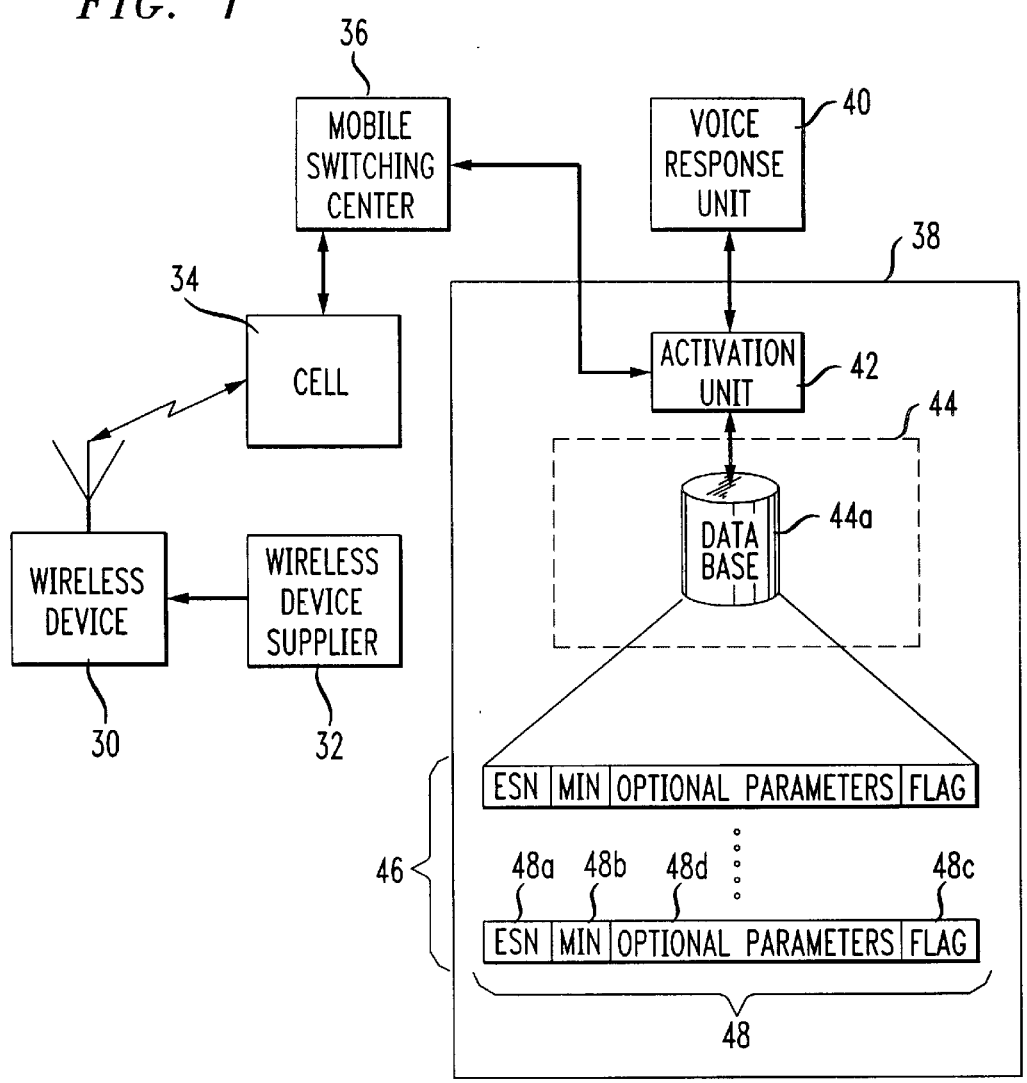
FIG. 1 is a simplified block diagram of a wireless device and its interaction with a system incorporating an embodiment of the invention.

FIG. 1 is a simplified block diagram showing a wireless device 30 and its interaction with a system incorporating an embodiment of the present invention.

As is well known, wireless communication devices contain stored information specific to the subscriber owner or lessee. In the case of cellular communication devices, such information is referred to as Number Assignment Module (NAM) designation parameters. An example of such NAM parameters are listed in the following table:

| Parameter | Example |
|---|---|
| Electronic Serial Number (ESN) | 15604134393 |
| Mobile Identification Number (MIN) | 410-530-1122 |
| Access Overload Class | 014 |
| Group Identification | 10 |
| Security Code | 71833 |
| Group ID Mark | 10 |
| Initial Paging Channel | 333 |
| Secondary Paging Channel | 708 |
| Wake Up Message | AT&T WIRELESS SERVICES |
| Lock Code | 122 |

For the NAM parameters noted above, ESNs are stored as binary representations but, typically displayed in either hexadecimal or decimal format. When ESNs are displayed in decimal format, they are displayed as eleven digit numbers. The first three digits are called the manufacturer prefix and indicate the manufacturer of the device. In the above table, the ESN of 15604134393 is shown in decimal format with the manufacturer being represented by the decimal number 156. When ESNs are displayed in hexadecimal format, they are displayed as eight digit numbers with the first two digits indicating the manufacturer of the device. Displayed in hexadecimal, another ESN might be C2A897DA, where the hexadecimal C2 indicates the manufacturer.

In accord with the invention, a wireless device supplier 32, for example, a third-party warehouse, order fulfillment center or mail order distribution center, is used to supply a recipient with wireless communication devices 30 in response to requests from a subscription service provider. Each wireless device 30 is fully preprogrammed with, in the case of a cellular phone, all the NAM parameters or, in the case of other wireless communication devices, their functional equivalent, so that, when the wireless device is sent to the recipient by the wireless device supplier 32, no further programming of the wireless device 30 is required. Additionally, the subscription service provider provides the wireless device supplier 32 with a group or block of wireless telephone numbers or their functional equivalent which, in the case of cellular telephones are referred to as Mobile Identification Numbers (MINs).

When the subscription service provider requests that the wireless device supplier 32 send a wireless device to fill an order, the wireless device supplier 32 takes a fully programmed wireless device and sends it to the intended recipient. Advantageously with the invention, the wireless device supplier 32 never has to identify the MIN, or its analog, of the particular wireless device 30 to the subscription service provider. With other variations of the invention, the wireless device supplier 32 never has to identify the ESN, or its analog, of the particular wireless device 30 to the subscription service provider. With still other variations of the invention, the wireless device supplier 32 never has to identify the MIN or ESN, or their analogues, of the shipped wireless devices to the subscription service provider.

Turning now to the rest of FIG. 1, which shows in functional block diagram form, a simplified typical wireless communication system configured for use with the invention.

The communication system is made up of a base station or mobile cell site or cell 34 capable of bidirectional wireless communication with the wireless device 30. The cell 34 bidirectionally communicates with a Mobile Switching Center (MSC) 36, sometimes referred to as a Mobile Telephone Switching Office (MTSO). The MSC 36 is connected, for bidirectional communication, with a subscription activation system 38.

It will be of course be recognized that the typical wireless communication system contains other elements, such as switches, additional cells, etc., which, for simplicity of explanation are not shown because they are well known and not required for an understanding of the invention.

Optionally, the subscription activation system 38 may be connected to a communication system based Voice Response Unit (VRU) 40, the construction and functional operation of which is well known in the art of telephony.

The subscription activation system is made up of two major functional components, an Activation Unit 42 and a Provisioning/Database Management Unit 44.

The Provisioning/Database Management Unit's 44 function is to receive and transmit information from, and to, the Activation Unit 42, and maintain an indication of whether a wireless device is non-activated or activated in a database 44a.

An example of a system suitable for performing the functions of the Provisioning/Database Management Unit is the Cincinnati Bell Information Services (CBIS) activation system running the Macro Cell and Switch Manager applications.

The CBIS Macro Cell application updates and maintains the stored records in the CBIS customer profile database for active cellular telephones. The CBIS Switch Manager application interacts with the Macro Cell application to provision or alter switch programming based upon changes to the CBIS customer profile database.

In one embodiment of the invention, the database 44a is constructed to contain records 46 made up of multiple data items 48. In a minimally configured system, the stored data items are only the parameters necessary for activation, e.g. the ESN 48a and the MIN 48b, and a flag or bit 48c which indicates whether a specific wireless device is activated or non-activated. Of course, in a more complex system, a record may optionally contain pointers to, or indirect representations of, the above data items or other parameters 48d. Examples of optional parameters may include one or more of the following: additional NAM parameters, security code, user password information, subscriber identification information, data to identify a level of service, particular features, special billing information, or such other data which may be service specific or otherwise useful to the service provider.

Figure 2:
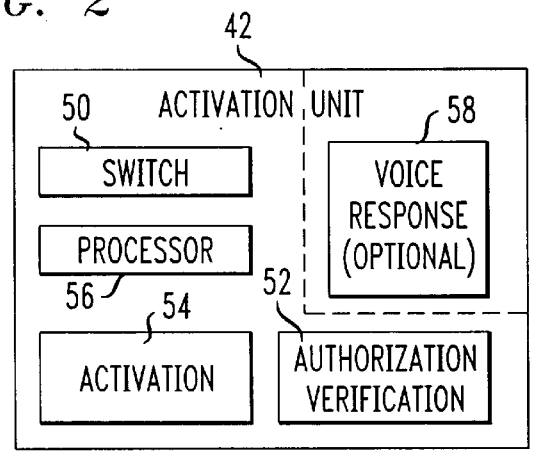
FIG. 2 is a block diagram of the functional components of an activation unit in an embodiment of the invention.

Turning now to FIG. 2 which is a block diagram of the functional components of the Activation Unit 42 of FIG. 1.

The Activation Unit 42 is made up of four functional components, a switch 50, an authorization verification module 52, an activation module 54, and a processor 56. Optionally, the Activation Unit may also interface with the communication system based Voice Response Unit (VRU) 40 (of FIG. 1) or as shown in FIG. 2, contain built-in voice response unit functionality 58.

The switch 50, which may be a PBX, CTX or network switch such as a 5ESS, functions as the bidirectional communication interface between the MSC 36 and the Activation Unit 42. In a preferred embodiment, the switch function is performed by a PBX. The authorization verification module 52 is an application which is used, for example; to check creditworthiness using, for example, a social security number, an account number or other appropriate identification information, or to perform a security check at activation, for example, using a security code provided by the subscription service provider, a password, social security number, mother's maiden name, home address or telephone number, etc.

The activation module 54 is an application which receives information sent by the wireless device 30 of FIG. 1, and, as cooperates with the Provisioning/Database Management Unit 44 to activate the wireless device in the subscription activation system 38.

The processor 56 executes the programs necessary for operation of the activation module 54 and is further used to process data and/or audio signals originating from, or for sending such signals to, the wireless device 30. Depending upon the particular wireless device, input and display capabilities may vary. For example, with cellular phones, only the push button telephone keyboard and a few dedicated keys (e.g. "SEND") are available to the user for input of information whereas, with laptop computers, the entire QWERTY keyboard as well as programmable function keys are available for input. In a similar manner, different wireless devices may use different communication protocols and/or symbols. As a result, depending upon the capabilities of particular wireless devices, the processor 56 may be constructed to process analog and/or digital data signals, for example, voice or a cellular digital packet data (CDPD) in addition to processing conventional dual tone multi-frequency (DTMF) (e.g. Touch Tone) signals. In alterntive embodiments, the processor can be used to implement voice response unit functionality 58 in the Activation Unit 42. In still other alternative embodiments, the processor is used to take advantage of caller identification (Caller-ID) technology, so that when a call from a non-activated wireless device is connected to the Activation Unit, the MIN can automatically be obtained from the Calling Line Identification (CLI) information using known techniques, for use in the activation process.

Although a non-activated wireless device cannot, in general, be used for communication. It is known that wireless service providers can provide unblocked communications channels which allow unregistered wireless devices to place calls to particular numbers, for example, *611 is commonly used in many cellular telecommunication networks for providing information or services to non-registered users. In an analogous manner, the subscription service providerestablishes an unblocked number, for example, corresponding to the easily remembered word "ACITVATE" preceded by a "#" or asterisk, which is dedicated to the subscription activation system 38. Alternative dedicated numbers might be, for example, a three digit number preceded by an asterisk or "#" symbol, a seven digit local number, or an eleven digit number, which is preferably a toll-free number.

The system is set up so that all calls to the dedicated number are routed by the cell 34 to the MSC 36 and switched by the MSC 36 to the subscription activation system 38.

Having described the subscription activation system, the operation of the automatic activation system will now be discussed by way of example using a wireless device which contains cellular telephone type NAM parameters. For simplicity, operation will be described with reference to touch tone-type signaling and voice response capability, however, as discussed above it will be recognized that other signaling techniques, sequences, and capabilities, whether digitally encoded or not, may be used to accomplish the same result without departing from the invention.

Referring now to FIGS. 3 through 6, those figures are diagrams of the operational flow of variants of the invention. At the top of each of the figures are the functional devices. The vertical axis represents time and the horizontal axis represents operational flow. The horizontal lines between the functional devices parallelling the horizontal axis represent the particular steps and the functional participants. For discussion purposes, many of the steps are illustrated as occurring sequentially and some substantially simultaneously. It should be recognized however, that depending upon the particular implementation, the sequencing or simultaneity may be different. For example and as will be discussed in greater detail below, it will be understood that, where an illustrated variation involves receiving more than one piece of information from the wireless device as separate steps those steps could straightforwardly be combined into a single step (e.g. receipt of the ESN and the identity verification security code occur together, receipt of the ESN and the MIN occur together, receipt of the MIN and the security code occur together etc.). Similarly, substantially simultaneous steps could be performed separated in time. Because of the large number of possible variations in ordering, it should be recognized that other than where logically required, the invention and its operation are independent of any particular order.

For purposes of discussing FIGS. 3 through 6, it will be presumed that a customer who wishes to subscribe to a wireless communication service, calls a subscription service provider to request the service. The subscription service provider opens an account for the customer by requesting the typical information such as, name, billing address, payment method, assent to terms and conditions of service, etc. The subscription service provider then tells the customer to expect the phone by overnight delivery, second day delivery, etc.

Figure 3:
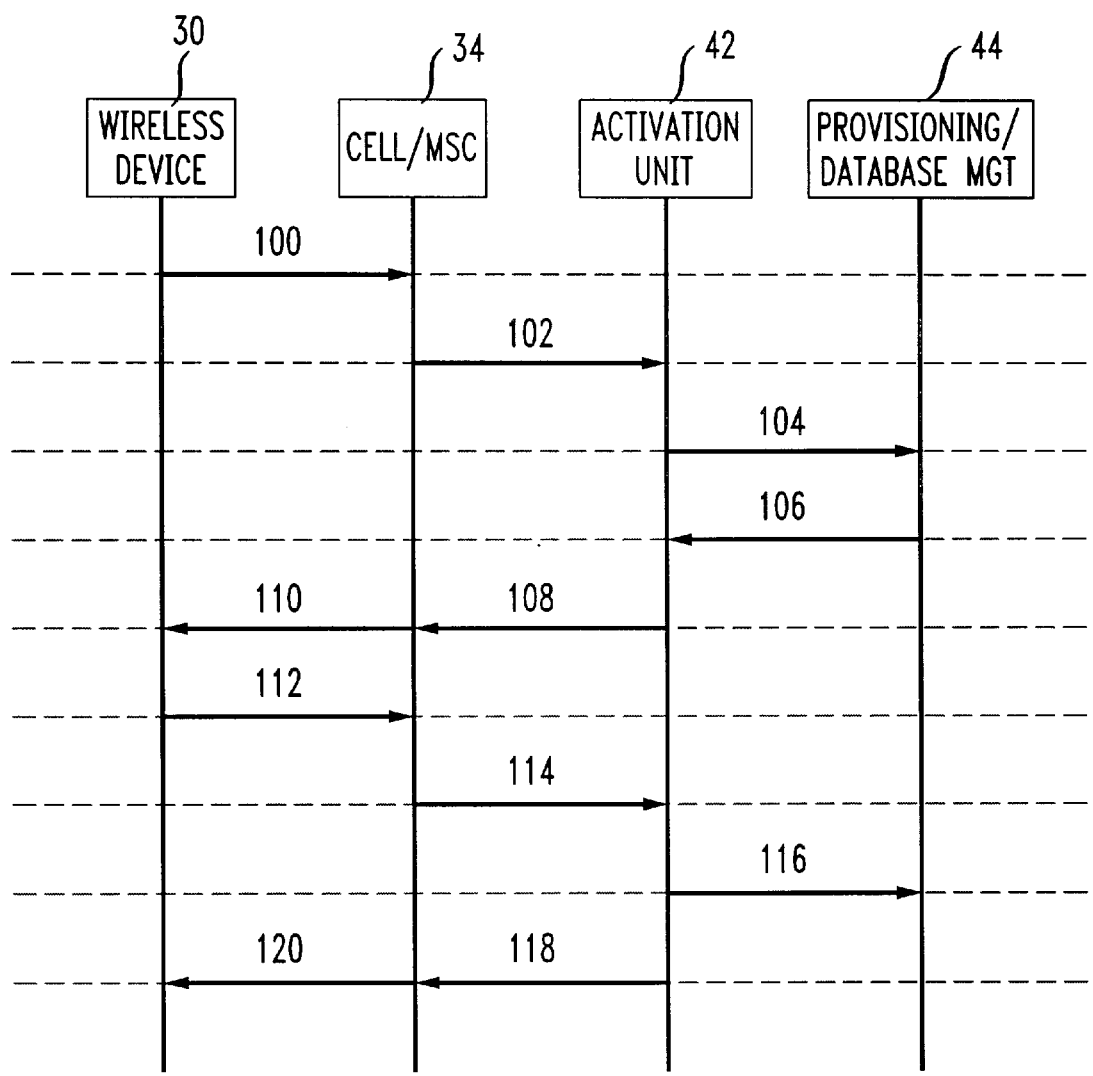
FIG. 3 is a diagram showing the operational flow in accord with one embodiment of the invention.

FIG. 3, is a diagram showing the call flow in accord with one embodiment of the invention. For this embodiment it is assumed that only authorization is required because the customer has provided all the necessary billing and credit related information at the time the service was ordered and the subscription service provider has agreed upon a security code with the customer.

When the security code is provided by the service provider or the wireless device supplier 32, for maximum security, the security code is provided by a different method of delivery than that used for the wireless device, so that the two deliveries are removed in time from each other and preferably sent so that the security code is received before the device. For example, if the wireless device is sent by regular mail, the security code may be provided by a phone call from the wireless device supplier 32 or the subscription service provider, or by overnight delivery, fax, E-mail, etc.

At the time the subscription service provider contacts the wireless device supplier 32 with the order, the wireless device supplier 32 provides the subscription service provider with the ESN of the wireless device 30 to be sent and the MIN programmed in that wireless device 30. The subscription service provider establishes an activation record in the database 44a in which the parameters necessary for activating the programmed but non-activated wireless device, in this case, the ESN, MIN, are complete but the indicator is set to non-activated.

Following receipt of the programmed non-activated wireless device, the recipient dials the dedicated number using the non-activated wireless device 30 which is, routed via a cell 34 to the MSC 36 (Step 100). The MSC 36 routes the call to the Activation Unit 42 (Step 102). The Activation Unit reads the MIN from the CLI information and accesses the activation record in the database 44a corresponding to that MIN (Step 104). The processor in the Activation Unit 42 then determines that, because all the parameters necessary for activation are already present, the criterion for activation is the matching of the agreed upon security code stored in the database 44a (Step 106). Using the voice response capability, the Activation Unit 42 prompts the recipient to provide a security code (Step 108). That request is transmitted back to the non-activated wireless device 30 via the MSC 36 (Step 110). Using the non-activated wireless device 30, the recipient inputs the security code and sends it via the MSC 36 (Step 112) to the Activation Unit 42 (Step 114). The Activation Unit 42 then compares the security code sent from the non-activated wireless device 30 with the security code in the database 44a using the authorization module 52. If the two security codes match, the authorization module 52 signals the processor 56 to change the state of the flag 48c to indicate that the wireless device 30 is now in an activated state (Step 116). At or about the same time, the Activation Unit 42 sends an indication to the MSC 36 that the wireless device 30 is now registered and activated (Step 118) and informs the recipient, for example, using the voice response capability or a digital signal, that their wireless device 30 is now activated (Step 120).

Figure 4:
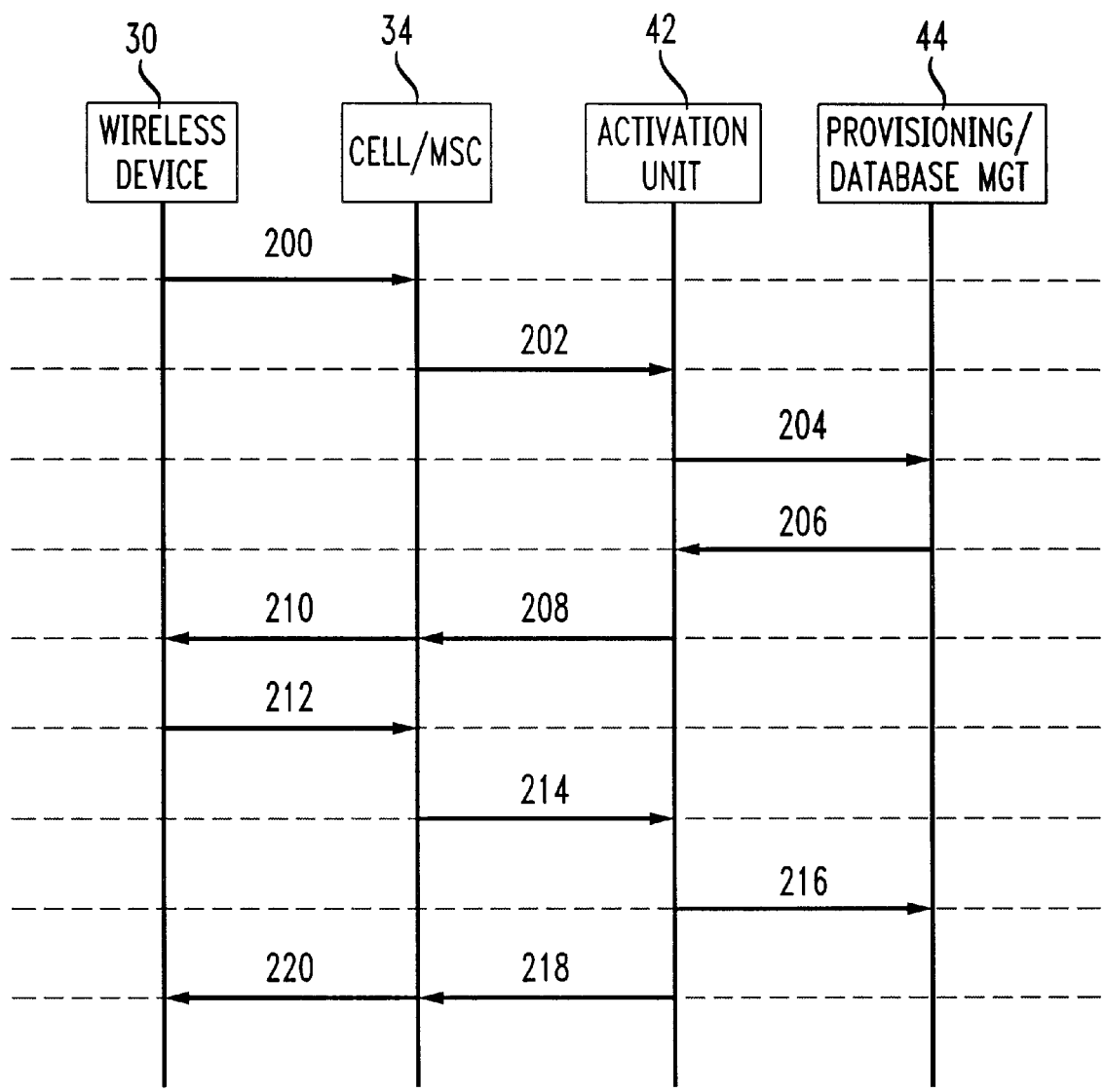
FIG. 4 is a diagram showing the operational flow in accord with another embodiment of the invention.

FIG. 4 is a diagram showing the call flow in accord with another embodiment of the invention. In this embodiment, a set of activation records corresponding to the group the MINs assigned to the wireless device supplier 32 is stored in the database 44a. Additionally, the subscription service provider has no way of knowing, at the time of creation of the activation record, what non-activated wireless device 30 is being sent by the wireless device supplier 32. Consequently, the service provider cannot know the ESN of the non-activated wireless device 30. Thus, when the customer places the order, the service provider informs the customer that they will be receiving a "security code" separate from the phone, to ensure that the ordering customer and the recipient of the non-activated wireless device are one and the same. Actually, the "security code" will be the ESN of the non-activated wireless device 30 and will be provided to the customer/recipient by the wireless device supplier 32, preferably in the secure manner described above.

The flow proceeds as follows. Following receipt of the programmed non-activated wireless device, the recipient dials the dedicated number using the non-activated wireless device 30 which is routed via a cell 34 to the MSC 36 (Step 200). The MSC 36 routes the call to the Activation Unit 42 (Step 202). The Activation Unit reads the MIN from the CLI information and accesses the database using the MIN (Step 204). The processor in the Activation Unit 42 obtains the proper activation record and determines that, because the ESN is missing, all the parameters necessary for activation are not present (Step 206). Using the voice response capability, the Activation Unit 42 prompts the recipient to provide a security code (Step 208). That request is transmitted back to the non-activated wireless device 30 via the MSC 36 (Step 210). Using the non-activated wireless device 30, the recipient inputs the security code (e.g. the ESN) and sends it via the MSC 36 (Step 212) to the Activation Unit 42 (Step 214). The Activation Unit 42 then enters the security code sent from the non-activated wireless device 30 into the activation record and determines, using the authorization module 52, that all the parameters necessary for activation are now satisfied. As a result, the authorization module 52 signals the processor 56 to change the state of the flag 48c to indicate that the wireless device 30 is now in an activated state (Step 216). At or about the same time, the Activation Unit 42 sends an indication to the MSC 36 that the wireless device 30 is now registered and activated (Step 218) and signals the recipient that their wireless device 30 is now activated (Step 220).

Figure 5:
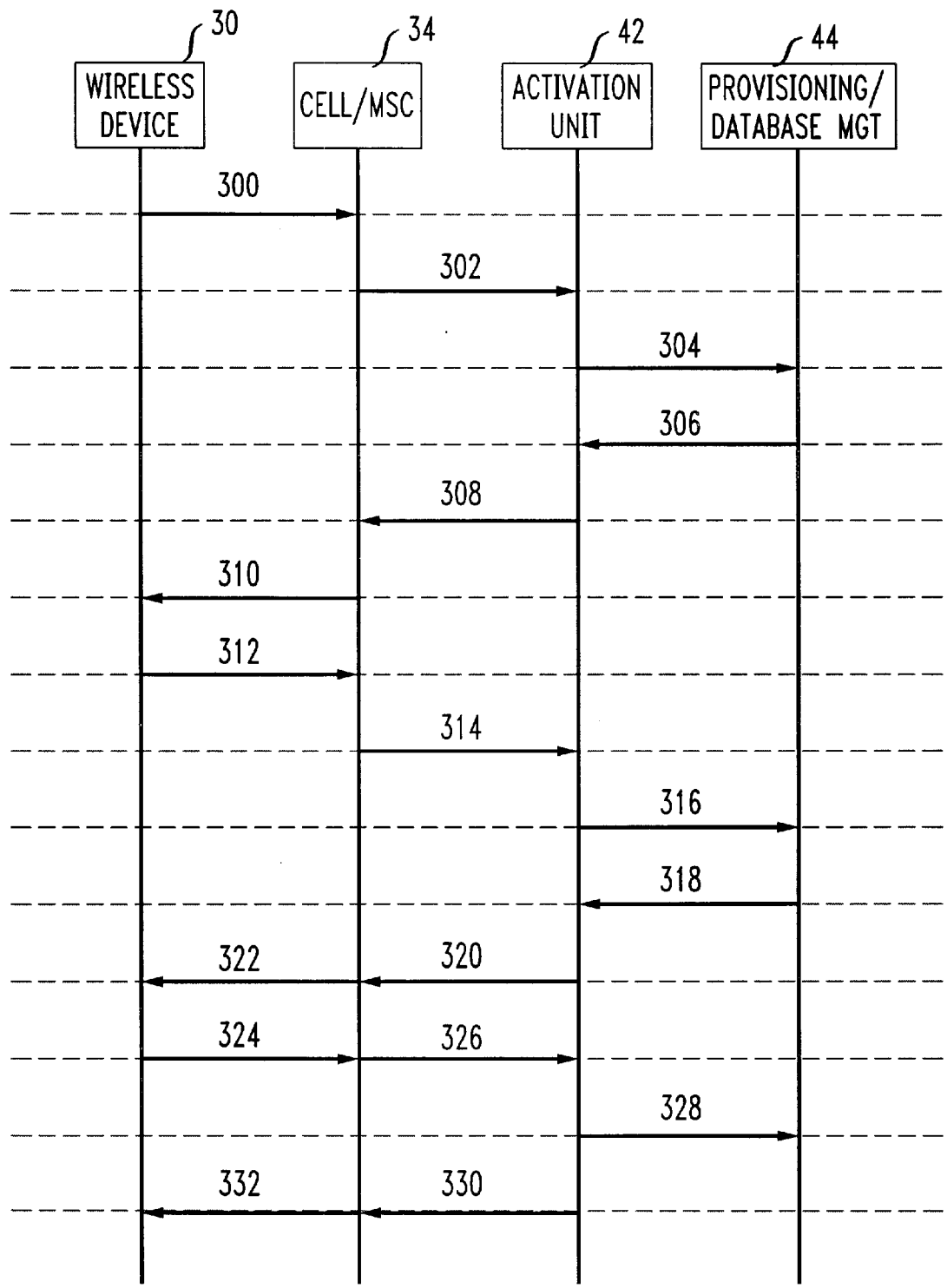
FIG. 5 is a diagram showing the operational flow in accord with yet another embodiment of the invention.

FIG. 5 is a diagram showing the call flow in accord with yet another embodiment of the invention. In this variant, the customer and service provider have agreed upon a security code which will be used for identity verification only. The wireless device supplier 32 however, provides neither the MIN nor the ESN to the service provider. The wireless device supplier 32 provides the ESN to the customer, preferably in the secure manner described above.

The Activation Unit 42 is configured so that the only parameters necessary for activation are the MIN and ESN. In other words, when an activation record contains both the MIN and ESN the set of parameters necessary for activation are immediately satisfied and the processor will automatically change the flag to indicate that the wireless device 30 is activated.

In this variant, upon receipt of the programmed non-activated wireless device, the recipient dials the dedicated number using the non-activated wireless device 30 which is routed via a cell 34 to the MSC 36 (Step 300). The MSC 36 routes the call to the Activation Unit 42 (Step 302). The Activation Unit reads the MIN from the CLI information and accesses the database using the MIN (Step 304). Since the wireless device supplier 32 has not identified the MIN to the service provider, no activation record is found (Step 306). Using the voice response capability, the Activation Unit 42 prompts the recipient to provide a security code (Step 308). That request is transmitted back to the non-activated wireless device 30 via the MSC 36 (Step 310). Using the non-activated wireless device 30, the recipient inputs the security code and sends it via the MSC 36 (Step 312) to the Activation Unit 42 (Step 314). The Activation Unit 42 then uses the security code to identify the proper activation record and populate it with the MIN (Step 316). The processor 56 then determines that the ESN is still missingfind therefore, that the set of parameters necessary for activation are not satisfied (Step 318). Using the voice response capability, the Activation Unit 42 prompts the recipient to provide the ESN (Step 320). That request is transmitted back to the non-activated wireless device 30 via the MSC 36 (Step 322). Using the non-activated wireless device 30, the recipient inputs the ESN and sends it via the MSC 36 (Step 324) to the Activation Unit 42 (Step 326). The processor 56 then populates the activation record with the ESN. Since the set of parameters necessary for activation are satisfied, the processor automatically changes the flag to indicate that the wireless device 30 is activated (Step 328). At or about the same time, the Activation Unit 42 sends an indication to the MSC 36 that the wireless device 30 is now registered and activated (Step 330) and signals the recipient that their wireless device 30 is now activated (Step 332).

Figure 6:
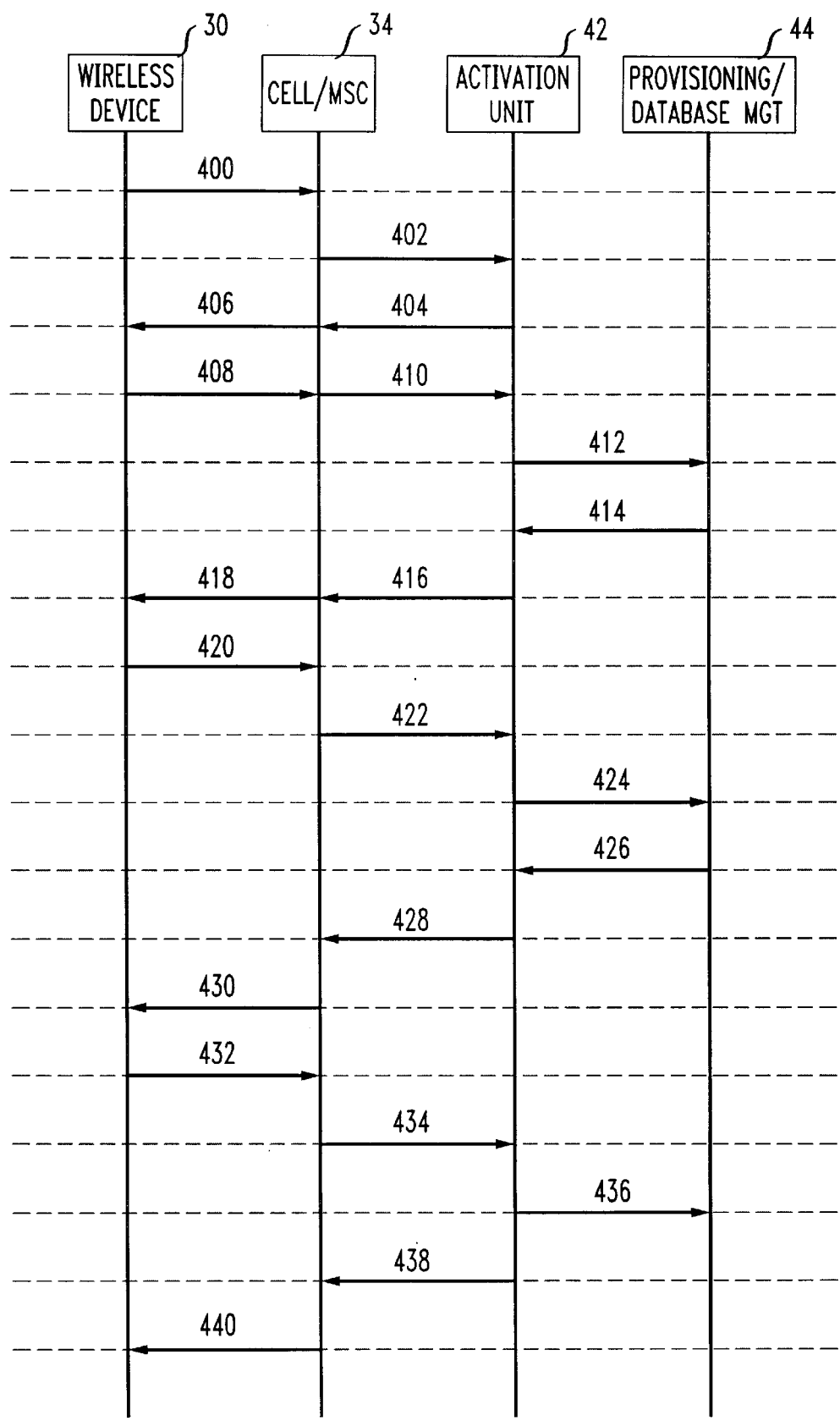
FIG. 6 is a diagram showing the operational flow in accord with yet another embodiment of the invention.

FIG. 6 is a diagram showing the call flow in accord with yet another embodiment of the invention. In this variant, the customer and service provider have agreed upon a security code which will be used for identity verification only. The wireless device supplier 32 however, provides neither the MIN nor the ESN to the service provider. The wireless device supplier 32 provides the ESN to the customer, preferably in the secure manner described above. Additionally, the system is incapable of automatically identifying the MIN from the CLI information.

In this variant, following receipt of the programmed non-activated wireless device, the recipient dials the dedicated number using the non-activated wireless device 30 which is routed via a cell 34 to the MSC 36 (Step 400). The MSC 36 routes the call to the Activation Unit 42 (Step 402). Using the voice response capability, the Activation Unit 42 prompts the recipient to provide the MIN (Step 404). That request is transmitted back to the non-activated wireless device 30 via the MSC 36 (Step 406). Using the non-activated wireless device 30, the recipient inputs the security code and sends it via the MSC 36 (Step 408) to the Activation Unit 42 (Step 410). The Activation Unit 42 reads the MiN from the CLI information and accesses the database using the MIN (Step 412). Since the wireless device supplier 32 has not identified the MIN to the service provider, no activation record is found (Step 414). Using the voice response capability, the Activation Unit 42 prompts the recipient to provide a security code (Step 416). That request is transmitted back to the non-activated wireless device 30 via the MSC 36 (Step 418). Using the non-activated wireless device 30, the recipient inputs the security code and sends it via the MSC 36 (Step 420) to the Activation Unit 42 (Step 422). The Activation Unit 42 then uses the security code to identify the proper activation record and populates it with the MIN (Step 424). The processor 56 then determines that the ESN is still missing and therefore, that the set of parameters necessary for activation are not satisfied (Step 426). Using the voice response capability, the Activation Unit 42 prompts the recipient to provide the ESN (Step 428). That request is transmitted back to the non-activated wireless device 30 via the MSC 36 (Step 430). Using the non-activated wireless device 30, the recipient inputs the ESN and sends it via the MSC 36 (Step 432) to the Activation Unit 42 (Step 434). The processor 56 then populates the activation record with the ESN. Since the set of parameters necessary for activation are satisfied, the processor automatically changes the flag to indicate that the wireless device 30 is activated (Step 436). At or about the same time, the Activation Unit 42 sends an indication to the MSC 36 that the wireless device 30 is now registered and activated (Step 438) and signals the recipient that their wireless device 30 is now activated (Step 440).

Having described several variants of the operation of the invention, It should now be evident that other variations which additionally, or alternatively, prompt for other information as described herein may be straightforwardly implemented in a similar manner and used for activation or verification purposes.

Thus, while there have been shown and described and pointed out fundamental novel features of the invention as applied to preferred embodiments thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto.

What is claimed is:

1. A method for activating a wireless telecommunication device in a wireless service system comprising the steps of:
   receiving information comprising a non number assignment module (NAM) parameter and at least one NAM parameter, transmitted over a wireless channel from a programmed, non-activated, wireless telecommunication device,
   identifying an activation database record using said non-NAM parameter information:
   populating a field of said activation database record with said NAM parameter information;
   verifying that said NAM parameter information populates sufficient fields in said activation database record so as to satisfy a previously determined criterion necessary for activation of said wireless telecommunication device; and
   activating said wireless telecommunication device based upon said satisfaction of said criterion.

2. The method of claim 1 further comprising the step of receiving second information from the wireless device and verifiing credit authorization prior to performing said activating step using said second information.

3. The method of claim 1 wherein said activating step includes the step of changing an indicator, capable of indicating a non-activated state and an activated state for the wireless device, from said non-activated state to said activated state in the subscription activation system.

4. The method of claim 1 wherein said first information is an Electronic Serial Number.

5. The method of claim 4 further comprising the step of prompting for the additional input of a subscriber identification number, capable of being used for credit verification, into said non-activated device.

6. The method of claim 1 wherein said first information is a Mobile Identification Number.

7. The method of claim 6 further comprising the step of prompting for the additional input of a subscriber identification number, capable of being used for credit verification, into said non-activated device.

8. The method of claim 1 further comprising the step of providing said non-activated device to a selected recipient.

9. The method of claim 1 further comprising the step of informing a third party to provide said non-activated device to a recipient capable of supplying said first information.

10. The method of claim 1 further comprising the step of using said information as data for an automatic wireless service activation program running in an activation unit of the wireless service system.

11. The method of claim 1 further comprising the step of providing for delivery of said non-activated wireless telecommunication device to a selected recipient.

12. The method of claim 1 further comprising the steps of providing said information and said non-activated wireless telecommunication device to said selected recipient via at least one third party.

13. The method of claim 12 wherein the providing step comprises the sub-steps of:
    providing said non-activated wireless telecommunication device to said selected recipient by a first delivery method; and
    providing said information to said selected recipient by a second delivery method.

14. The method of claim 13 wherein said first delivery method and said second delivery method are the same delivery methods but are removed in time from each other.

15. A system for automatic activation of wireless devices comprising:

an activation unit which receives and processes information said information including data items sent from a fully programmed and non-activated wireless device to determine, using said information, if sufficient information has been received and populated into an activation database record field so as to satisfy an activation criterion necessary for activation of said fully programmed non-activated wireless device in the system, and activates the wireless device based upon satisfaction of said criterion, said activation unit including means for prompting for input of first, second and third data items, said first data item being a non-NAM parameter known to said activation system and for identifying an activation record using said first data item so that said activation record may be populated with said second and third data items, one of said second or third data items being a NAM parameter.

16. The system of claim 15 further including an authorization verification unit configured to compare at least a portion of said information with items of data stored in the system and, if said portion of said information matches said items of data, to issue an authorization signal to said activation unit.

17. The system of claim 15 further including an indicator capable of indicating a non-activated state and an activated state for the wireless device.

18. The system of claim 17 further including a processor which is capable of changing said indicator from said non-activated state to said activated state.

19. A wireless device activation system comprising:

means for receiving information from a fully programmed non-activated wireless device, a database in said receiving means having activation records, each of said activation records including at least two fields each of said fields being capable of holding at least one number assignment module (NAM) parameter, means for prompting for input of first, second and third data items, said first data item being a non-NAM parameter known to said activation system and said second and third data items being NAM parameters which are not known to said activation system, a processor for identifying an activation record using said first data item, populating said two fields of said activation records with said second and third data items, and determining that said second and third data items satisfy all criteria necessary for activating said fully programmed non-activated wireless device; and means for automatically activating said non-activated wireless device in the system in response to a determination that said all criteria are satisfied.

20. The system of claim 19 further comprising:

means for verifying credit authorization to activate said non-activated wireless device.

21. The system of claim 19 further comprising:

an indicator capable of indicating an non-activated state and an activated state for said wireless device, and means for changing said indicator from said inactive state to said active state.

22. The system of claim 19 wherein said second data item comprises an Electronic Serial Number.

23. The system of claim, 19 wherein said second data item comprises a Mobile Identification Number.

24. The system of claim 19 wherein said second data item comprises a Number Assignment Module parameter other than an Electronic Serial Number and a Mobile Identification Number.

25. The system of claim 19 further comprising:

means for prompting a user to input said first, second and third data items into said non-active wireless device.

26. The system of claim 19 further comprising:

means for automatically extracting said second data item from calling line identification information associated with said fully programmed non-activated wireless device.

27. A method for activating a device in a wireless service subscription system comprising the steps of:

dialing a number dedicated to connecting the device to the wireless service subscription system, sending a non-Number Assignment Module parameter, from a non-activated wireless device to said wireless service subscription system over a wireless channel which, upon receipt by said wireless service subscription system will cause said wireless service subscription system to identify an activation record using said non-Number Assignment Module parameter, sending a Number Assignment Module parameter, from said non-activated wireless device to said wireless service subscription system over a wireless channel which, upon receipt by said wireless service subscription system will cause said wireless service subscription system to populate an activation record field and activate said non-activated wireless device based upon said population with said Number Assignment Module parameter.

* * * * *

UNITED STATES PATENT AND TRADEMARK OFFICE
CERTIFICATE OF CORRECTION

PATENT NO. : 5,956,636
DATED : September 21, 1999
INVENTOR(S) : James Mason Lipsit It is certified that error appears in the above-identified patent and that said Letters Patent is hereby corrected as shown below:

Column 1,
Line 9, "THIE" should read -- THE --
Line 16, "Currendy" should read -- Currently --
Line 54, "TEE" should read -- THE --

Column 2,
Line 60, "intemet-specific" should read -- internet-specific --

Column 5,
Line 62, "ACITVATE" should read -- "ACTIVATE" --

Column 7,
Line 11, "which is, routed" should read -- which is routed --

Column 8,
Line 54, "missingfind" should read -- missing and --

Signed and Sealed this

Fifteenth Day of June, 2004

JON W. DUDAS
*Acting Director of the United States Patent and Trademark Office*